Patented Sept. 1, 1942

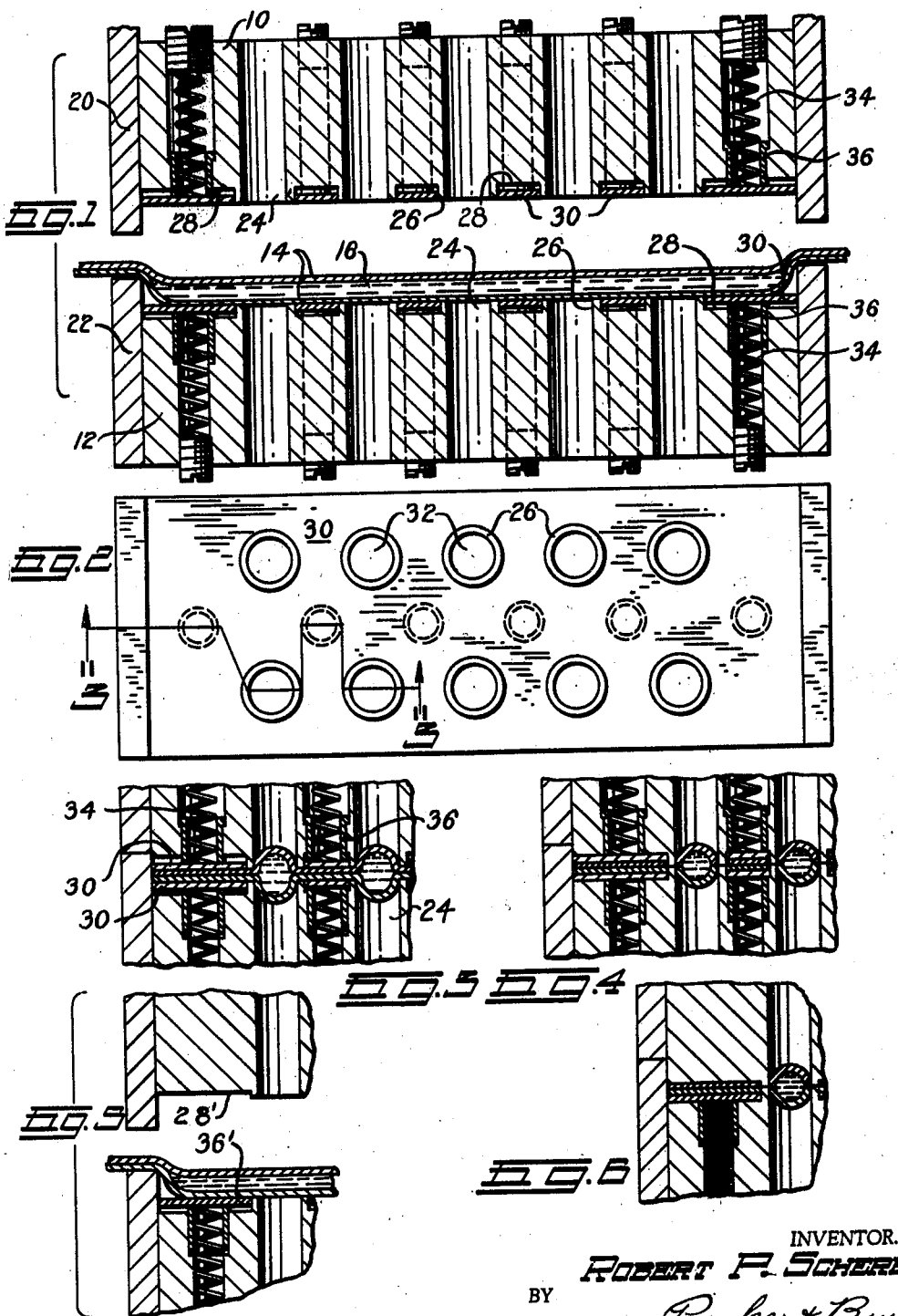

2,294,633

UNITED STATES PATENT OFFICE 2,294,633

CAPSULE FORMING APPARATUS

Robert P. Scherer, Detroit, Mich.

Application July 16, 1940, Serial No. 345,805

5 Claims. (Cl. 18—19)

This invention relates to apparatus for manufacturing capsules and particularly to improvements in the construction of the die members for shaping, filling and sealing the capsules.

Attempts have been made in the past to form capsules between die members by die-structures having faces composed of parts which are moved relative to one another to effect various operations at the time the capsules are formed. One such apparatus comprises two die members having their faces formed of several movable parts controlled in their movement to provide cavities in which the capsules are formed, cutting edges for sealing the capsules and severing the same from the sheets of capsule forming material, and recessed areas outside of the cavities into which the unused forming material was collected. The movable parts of this apparatus were controlled from different operating sources. Such an apparatus contained quite a number of separate movable parts and required a separate operating mechanism for each part. Such an apparatus was relatively costly to manufacture and operate.

It is an important object of this invention to provide improved die structure for forming, sealing and severing filled capsules which is inexpensive to manufacture, assemble and operate. Another object of this invention is to provide a die structure for forming capsules composed of two die members having their respective faces formed in a novel way for filling, receiving and severing the capsules in one operation and without waste of the filler content material. More particularly, it is an important object of this invention to provide a pair of die members for forming filled sealed capsules formed in a novel way with non-yielding marginal portions around each die cavity and yielding portions in the areas between the cavities outside the margins thereof. An important feature of this invention is the novel provision for rendering the areas between the rigid margins of the die cavities resistingly yieldable to forces applied perpendicular to the faces of the die members and controlling the extent of the yieldable movement to provide the desired clearance between the faces of the die members at the time the capsules are filled and sealed.

Various other objects, advantages and meritorious features will become more fully apparent from the following specification, appended claims and accompanying drawing, wherein:

Figure 1 is a vertical, sectional view taken through a die structure formed in accordance with this invention and composed of two die members movable toward and away from one another and showing the manner in which the capsule forming material is positioned preparatory to forming capsules therefrom, Fig. 2 is a view of the face on one of the die members of Fig. 1 showing the novel plate means associated therewith and the manner in which it is perforated to allow the cutting edges to project therethrough, Fig. 3 is a fragmentary sectional view of the die structure along lines 3—3 of Fig. 2 showing the position of the parts as the upper die member engages the top side of the capsule forming material, Fig. 4 is a fragmentary sectional view similar to Fig. 3, but showing the parts of the die structure after the die members have completed their operating stroke, and Figs. 5 and 6 are fragmentary sectional views of a modified form of the invention showing in Fig. 5 the position of the parts before the capsules are formed and in Fig. 6 the position of the parts after the capsules are formed.

The die structure is composed of two die members having their adjacent faces correspondingly shaped so that when capsule forming material is interposed therebetween and the faces advance upon one another capsules are automatically filled, sealed and severed from the balance of the material.

Referring more particularly to the drawing, the die members are designated by reference numerals 10 and 12. In the present embodiment of the invention, one of the die members is mounted for reciprocal movement toward and away from the other. It is understood, however, that certain of the features of the invention described herein are applicable to other forms of die structures movable in other ways, such as for example, a pair of die rolls mounted side by side on parallel axes and rotatable to bring the die cavities successively into registration.

In the illustrated embodiment of the invention, the die member 10 superimposes the die member 12 and is mounted for movement toward and away from the latter. The material out of which the capsules are formed and filled is disposed between the die members. This material usually comprises two sheets of capsule shell forming material indicated at 14—14 between which is flowed capsule filler content material 16. The two sheets 14—14 and the filler content material are laid upon the lower die member 12 in the manner shown in Fig. 1.

Surrounding both the die members 10 and 12 are frames with project beyond the faces of the die members with which they are associated. The frames are of the same dimension so that as the die members approach one another the adjacent edges of the frames are first to abut. The frame for the upper die member is indicated at 20; the frame for the lower die member at 22. When they abut they form an enclosed space between the faces of the die members. One or both of the frames may be mounted for yieldable retractible movement relative to the die member with which it is associated. This will allow the faces of the die members to be brought into engagement after the frames abut one another. It is noted in Fig. 1 that the margins of the sheets of shell forming material 14—14 extend upwardly and over upon the lower frame 22. In this manner the sheets 14—14 form a pocket on the face of the die member 12 within which the filler material 16 is retained.

The die members 10 and 12 are in general similar to one another. Each is provided with a plurality of capsule forming recesses or cavities 24. These cavities are formed in the faces of the respective die members by boring passages from one side of the die blocks to the other. By opening out the passages to the side of the die members opposite to their working faces each cavity is provided with an air vent so that it is impossible for any air to be confined under pressure in the cavities at the time the capsules are formed. The cavities 24 may be of any desired formation, round such as that shown to produce spherical capsules, or oval, or any other formation, for forming capsules of different shapes. Cutting edges or ledges are formed around each cavity for sealing and severing the capsules from the unused material. These cutting edges are indicated at 26. They are preferably formed by milling out the material of the face of the die members between the cavities except for a marginal portion around each cavity. Recessed areas indicated at 28 are formed in this manner. A novel provision in the recessed areas exerts a yielding pressure on the capsule forming and filling material. The face of each die member may be therefore considered as being composed of spaced cavities surrounded by areas of two distinct kinds, an area immediately adjacent each cavity which is rigid and non-yielding in character forming the cutting ledge heretofore described and areas between the ledges outside the cavities which are relatively yieldable to pressure exerted perpendicular to the faces.

In the illustrated embodiment of the invention the novel yielding means acting upon the capsule forming material in this manner comprises an element associated with one or both die members which is resistingly movable from a position substantially flush with the cutting edges 26 to a retracted position in the recessed areas 28. As illustrated in the embodiment of the invention, Figs. 1 to 4, the element associated with each die member is in the form of a metal plate 30 provided with holes 32 (Fig. 2) corresponding in number and position to cavities in the die members and of such a size that the cutting edges of each die member project through the plate as indicated in Fig. 1. One plate for each die member is to be preferred but several plates may be used for the face of each die member, if desired. The outside dimensions of the plates 30 are such that they snugly fit within the frames 22 and 20.

The depth of the recessed portion 28 on the face of each die member preferably bears a definite relationship to the thickness of the plate 30 retractible therewithin. In order that the plates may be retracted within these recessed portions the proper amount, the depth of the recessed portions should be such that when the cutting edges of the die members abut as shown in Fig. 4 the distances to which the two plates 30 can be separated from one another is substantially equal to or a little less than twice the thickness of the sheets 14—14 of shell forming material. This will allow the unused portions of the shell forming material to be retained between the two plates 30, but all other material, especially the filler content material, will be forced into the areas in line with the cavities.

The plates 30 are urged by novel means to positions substantially flush with the cutting edges 26 of the die member with which they are associated. This means comprises one or more coil springs 34 mounted in the die blocks and seated so as to exert a yielding pressure on the plates 30 urging them toward a position on the level with the cutting edges. The die blocks are preferably bored from one side to the other to form cylindrical chambers in which the springs are mounted. The plates are provided with sleeves 36 of a size to enter these chambers. The coil springs are of such a diameter that they extend through their sleeves and bear on the bottom or rear sides of the plates. The opposite ends of the springs are seated upon members 38 in the form of bolts threaded in the rear ends of the chambers. These bolts are provided with screw driver slots to assist in the assembly of the springs and to provide adjustment of the spring tension after the assembly is completed.

Preferably a plurality of springs 34 are provided for urging each plate outwardly away from the recessed areas of the die members. They are preferably located in equally spaced apart condition in the manner illustrated in Fig. 2. The springs are adjusted to exert substantially equal pressure on all parts of the plates 30. In order to keep the plate associated with the upper die from falling below the cutting edges, the inner ends of the sleeves associated with the upper plate may be provided with outwardly extending flanges which engage shoulders formed in the walls of the chambers containing the springs. One such arrangement is shown in Fig. 1. The flanges and shoulders are so disposed that when they abut the plate lies flush with the cutting ledges.

The operation in general of the die members is readily understood from the preceding description. However, in order to bring out certain salient features of the invention the successive steps in the operation will be described in detail. The die structure in Fig. 1 is in initial operating position. The die members are spaced apart and the material for forming the capsules stretches across the face of the lower die member in the manner shown.

In Fig. 3, the die members have been advanced upon one another and the plate 30 and the cutting edges of the upper die member have advanced far enough to squeeze the filler content material 16 into the areas opposite the cavities 24. In Fig. 3, the die members have been advanced to that point where all the filler content material has been forced out of the areas opposite the recessed portions and the unused portions of the two sheets 14—14 contact one another. It will be noted that in Fig. 3 the cutting edges have not penetrated any appreciable distances into the sheets 14—14.

Attention is also called to the fact that the force applied by the plates 30 on the capsule forming material is a yielding force but one which is constantly applied by the springs from the beginning to the end of the operation. There is a distinct advantage in this manner of applying pressure upon the capsule forming material. As the cutting edges penetrate further into the sheets 14—14, the material of the sheets immediately adjacent the cutting edges is forced laterally away therefrom. It has been found that if some force is present opposing the lateral displacement of this material, a better seal for the capsules will result. The plates 30 serve to function in this capacity. The fact that they are spring urged toward one another immediately adjacent the cutting edges sets up forces compressing the sheet material together without severing it. The action of compressing the sheets together creates a force opposing outward flow of sheet material from the cutting edges. The seal of each capsule formed is thus improved.

In Fig. 4, the die members have approached as close as they can. The cutting edges 26 have cut through the sheet material 14—14 and abut one another. The shell and filler material in the cavities are thus severed from the balance of the sheet material. The unused portions of the sheet material lie in a compressed state between the plates 30 as shown. The latter have by mutual opposition to one another retreated back into the recessed areas 28. The plates, however, continue to exert a yielding pressure upon the unused sheet material. From the time the face of the upper die contacts the top sheet 14 until the conclusion of the operation as depicted in Fig. 4, the plates exert a yielding pressure upon the unused portions of the sheet material. In the concluding movements of the operation the plates oppose one another through the unused portions of the sheets 14—14 and cause each to retract within their respective recesses. Even this movement is accomplished without permitting the plates to give up the pressure they exert on the capsule forming material. Thus at no time is it possible for the filler content material to flow back between the unused portions of the sheets 14—14.

An alternative construction is shown in Figs. 5 and 6. Instead of two plates 30—30, only one is used. This plate is associated as shown at 30' with the lower die member. It may, however, be associated with the upper die member if desired. The plate is similarly constructed and assembled on the die member as the plates 30 previously described. The only other difference in the die construction is the location of the face of the recessed area in the upper die member. This area is indicated at 28' and as shown in Fig. 5 is of less depth than the recessed area 28 previously described. It is of such depth that when the cutting edges of the two die members abut as shown in Fig. 6 there is only enough room between the plate 30' and the recessed area 28' to receive the two sheets 14—14. In other words, the maximum amount of clearance between the plate and the recessed area is equal to twice the thickness of the material used for forming the walls of the capsules.

What I claim is:

1. Apparatus for use in the manufacture of capsules including, in combination, a die member having a plurality of capsule forming cavities in the face thereof, an elevated ledge projecting from the face around each capsule forming cavity, plate means of less thickness than the height to which said ledges project disposed throughout the area of the face outside of the ledges and the cavities which they surround, and spring means yieldingly urging said plate means away from the face of the die member but yieldable to allow the plate to retract to a position recessed back from the projecting ledges.

2. Apparatus for use in the manufacture of capsules or the like comprising, in combination, a pair of movable die members each provided with a corresponding plurality of capsule forming cavities in the operating face thereof, the portion of the face of one of said die members immediately adjacent to and surrounding each cavity protruding beyond the remainder of the face and being shaped to form a cutting ledge, said remainder of the face throughout the area outside of said ledges being recessed back to a level therebelow, a plate associated with the operating face of said die member and provided with perforations corresponding in size and position to the cutting ledges surrounding the cavities in the face of the die member, said plate being movable from a position where its outer surface is substantially flush with the cutting ledges of the die member with which it is associated to a position therebelow within said recessed remainder of the face of the die member, and means carried by the die member with which the plate is associated exerting a yielding pressure tending to force the plate to assume the position in which its outer face is flush with the cutting ledges.

3. Apparatus for use in the manufacture of soft filled elastic capsules comprising, in combination, a pair of movable die members having opposed operating faces provided with a corresponding plurality of capsule forming cavities, each cavity surrounded by an elevated cutting ledge, the face of each die member in the area outside of said ledges being recessed back, a plate for the face of each die member provided with a plurality of perforations corresponding in number and position to said forming cavities, said plates seated within said recessed areas with their outer surfaces generally flush with the cutting ledges, said perforations being of a size to allow the cutting ledges to project therethrough, and means between each plate and the die member with which it is associated yieldingly urging the plate away from the face of the die member.

4. Apparatus for use in the manufacture of capsules comprising, in combination, a pair of cooperating die members provided with a plurality of corresponding capsule forming cavities in their respective faces, the portion of the face of one of said die members immediately adjacent to and surrounding each cavity protruding beyond the remainder of the face and being shaped to form a cutting edge about each cavity, and yieldable plate means on said remainder of the face and surrounding said protruding portions to fill in the entire area of the remainder of the face between said protruding portions, the outer face of said plate means terminating substantially flush with said cutting edges.

5. Apparatus for use in the manufacture of capsules comprising, in combination, a pair of cooperating die members provided with a plurality of corresponding capsule forming cavities in their respective operating faces, the portion of the face of one of said die members immediately adjacent to and surrounding each cavity protruding beyond the remainder of the face and being shaped to form a cutting edge about each cavity, and means surrounding said protruding portions to fill in the entire area of said remainder of the face between said protruding portions, said means being resistingly yieldable inwardly of the die member below the level of the cutting edges.

ROBERT P. SCHERER.